United States Patent
Belvin et al.

(10) Patent No.: US 7,379,870 B1
(45) Date of Patent: May 27, 2008

(54) CONTEXTUAL FILTERING

(75) Inventors: Robert Belvin, Malibu, CA (US);
Shubha Kadambe, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 639 days.

(21) Appl. No.: 11/051,747

(22) Filed: Feb. 3, 2005

(51) Int. Cl.
*G10L 15/18* (2006.01)

(52) U.S. Cl. ...................................... 704/255
(58) Field of Classification Search ................. 704/255
See application file for complete search history.

(56) References Cited

U.S. PATENT DOCUMENTS

| | | | | |
|---|---|---|---|---|
| 6,321,372 B1 * | 11/2001 | Poirier et al. | ................ | 717/122 |
| 6,446,035 B1 * | 9/2002 | Grefenstette et al. | .......... | 704/1 |
| 6,678,677 B2 * | 1/2004 | Roux et al. | .................... | 707/3 |
| 6,859,771 B2 * | 2/2005 | Zun et al. | ...................... | 704/1 |

* cited by examiner

Primary Examiner—Susan McFadden
(74) Attorney, Agent, or Firm—Tope-McKay & Associates (57) ABSTRACT

The present invention relates to techniques for contextual filtering for improving an output of a speech recognizer. The techniques comprise receiving a representation of a speech utterance into a shallow parser component in the form of a first word lattice including a set of potential language matches for the utterance, where the language matches include at least one word; the parser component operative for receiving and analyzing the first word lattice to produce a second word lattice, and including a filter that assigns a probability match for a potential word match in relation to another potential word match in the utterance based on a particular filter-specific criteria; and outputting the probability matches from the shallow parser component as a portion of a second word lattice for further processing to determine most likely combinations of words present in the speech utterance.

42 Claims, 6 Drawing Sheets

CONTEXTUAL FILTERING

BACKGROUND OF THE INVENTION (1) Technical Field

The present invention relates to contextual filtering for improving an output of a speech recognizer. More specifically, the present invention relates to techniques for contextual filtering that are to be used in dictation and speech understanding applications, improving the output by filtering out violations of grammatical structure.

(2) Description of Related Art

The field of speech recognition systems has been gradually developing over the past few decades, increasingly enabled by technological advances in the areas of computers and software.

Currently, dictation systems such as "ViaVoice" (in dictation mode), produced by International Business Machine Corporation (IBM), located at 1133 Westchester Avenue, White Plains, N.Y. 10604, are not able to pass recognizer results through grammatical parsers because the repertoire of grammatical constructions found in spontaneous speech is too large and variable to be adequately parsed by existing parser technology. Thus, the only check on grammatical well-formedness of an output from these recognizers is a language model typically comprised of uni-, bi-, or trigrams (single, two, three words in sequence) in a training corpus. Such n-gram language models are not adequate checks on the grammatical well-formedness of recognizer output because (i) they depend on the existence of the word sequences of interest in the training data, and therefore grammatical sequences of words may be rejected if they were not present in the training data, and (ii) many un-grammatical sequences of words may be accepted by the n-gram language model either because of smoothing, or simply because the model is only looking at pairs or triples of words as well as individual words, and, in some cases, the model would have to look at longer strings of words to catch some un-grammaticalities. Moreover, in order to create n-gram language models, a large corpus (millions of words to capture the statistics appropriately) of training data is needed.

In general, speech recognition systems operating in dictation mode which have been trained on "general" language training data perform somewhere around a 50-60% accuracy rate (i.e. they may show word-error rates (WERs) of 40-50%), and very often the WER is worse than 50%.

In speech understanding systems (as opposed to dictation systems), a parser is usually only be able to parse a small number of the possibilities output by the n-gram language model because of processing time constraints. The usual number is ten; that is, if a grammatical string is not found within the top ten candidates, the system will report that it couldn't understand the input sentence.

In light of the above, there exists a need in the art for a contextual filter that improves speech recognizer performance in terms of accuracy and time for speech recognizers operating in either dictation or speech understanding modes.

SUMMARY OF THE INVENTION

The present invention relates to a contextual filter for use within a computer-based speech recognition system. The contextual filter comprises a shallow parser input for receiving a representation of an utterance into a shallow parser component in a form of a first word lattice including a set of potential textual word sequence matches for the utterance, where the textual word sequence matches include at least one word; the shallow parser component operative for receiving and analyzing the first word lattice to produce a second word lattice, and including a filter selected from a group consisting of a sub-categorization licensing filter, a predication licensing filter, an adverbial licensing filter, and a discourse licensing filter, where the filter assigns a probability match for a potential word match in relation to another potential word match in the utterance based on a particular filter-specific criteria; and a shallow parser output for outputting the probability matches from the shallow parser component as a portion of a second word lattice for further processing to determine most likely combinations of words present in the utterance.

The sub-categorization licensing filter is configured to use co-occurrence restrictions found in syntactic lexicons to provide information as to what lexical categories may occur as a grammatical complement of a particular word (e.g., a syntactic head), and using the lexical categories to determine a likelihood of a match for a given vocabulary item, given the particular word (e.g., the syntactic head). In analyzing the first word lattice to produce the second word lattice, the sub-categorization licensing filter is configured to remove strings of text that fall below a predetermined threshold likelihood of match.

The predication licensing filter is configured to identify a relation between a subject and a predicate to determine a likelihood of a match for given vocabulary items. In analyzing the first word lattice to produce the second word lattice, the predication licensing filter is configured to remove strings of text that fall below a predetermined threshold likelihood of match.

The adverbial licensing filter is configured to identify a relation between modifying or reference-restricting phrases and phrases they modify to determine a likelihood of a match for given vocabulary items. In analyzing the first word lattice to produce the second word lattice, the adverbial licensing filter is configured to remove strings of text that fall below a predetermined threshold likelihood of match.

The discourse licensing filter is configured to identify a relation between phrases or sentences in a coherent discourse to determine a likelihood of a given match for given vocabulary items. In analyzing the first word lattice to produce the second word lattice, the discourse licensing filter is configured to remove strings of text that fall below a predetermined threshold likelihood of match.

In another aspect, the contextual filter further comprises an acoustic model input for receiving an utterance into an acoustic model component and producing a phoneme lattice for further processing into the word lattice; the acoustic model component operative for receiving the utterance and analyzing the utterance to produce a phoneme lattice that corresponds to the utterance; and an acoustic model output for outputting the phoneme lattice for further processing.

In yet another aspect, the contextual filter further comprises a phonotactics/pronunciation model input for receiving the phoneme lattice into a phonotactics/pronunciation model component; the phonotactics/pronunciation model component operative for receiving the phoneme lattice and converting the phoneme lattice into a first word lattice by applying phonotatic constraints to the phoneme lattice, thereby converting the phoneme lattice into the first word lattice; and a phonotactics/pronunciation model output for outputting the first word lattice for further processing.

Additionally, the contextual filter further comprises an N-gram language model input for receiving the second word lattice into an N-gram language model component; the N-gram language model component operative for receiving the second word lattice and converting the second word lattice into an N-best list by applying a language model component that outputs an N-best possible word string for a given utterance that have N highest likelihood values; and a N-gram language model output for outputting the N-best list from the N-gram language model component for further processing.

The contextual filter further comprises a full parser input for receiving the N-best list into a full parser component; the full parser component operative for receiving the N-best list and converting the N-best list into a parse sentence structure through at least one item selected from a group consisting of a syntactic parser and a semantic parser; and a full parser output for outputting the parse sentence structure from the full parser component.

In another aspect, in analyzing the first word lattice to produce the second word lattice, and when more than one filter is included in the contextual filter, the contextual filter is configured to multiply the probability match between each filter to create a cumulative probability match, and is further configured to remove strings of text that fall below a predetermined threshold cumulative probability match.

Finally, as can be appreciated by one in the art, the present invention is not limited to any one particular technique for contextual filtering, but can also be incorporated into other aspects such as a method and a computer program product. The other aspects can be configured to perform all of the acts of the contextual filtering described herein.

BRIEF DESCRIPTION OF THE DRAWINGS

The objects, features and advantages of the present invention will be apparent from the following detailed descriptions of the preferred aspect of the invention in conjunction with reference to the following drawings where.

DETAILED DESCRIPTION

The present invention relates to contextual filtering for improving an output of a speech recognizer. More specifically, the present invention relates to techniques for contextual filtering that are to be used in "dictation" and "speech understanding" applications, improving the output by filtering out violations of grammatical structure.

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various principal aspects of the present invention is provided. Third, an introduction is presented to provide the reader with a broad understanding of the present invention. Fourth, a discussion is provided to give an understanding of the specific details of the present invention. Finally, a conclusion is provided to summarize key aspects of the present invention.

(1) GLOSSARY

The purpose of this glossary is to provide a working frame of reference regarding some of the terms used in the description and claims and is given as a central resource for the reader. The glossary is intended to provide the reader with a general understanding of various terms as they are used in this disclosure, and is not intended to limit the scope of these terms. Rather, the scope of each term is intended to be construed with reference to this disclosure as a whole and with respect to the claims below. Thus, the definitions provided should not be considered limiting to the extent that the terms are known in the art.

COMLEX—the term "COMLEX" refers to a monolingual English Dictionary consisting of approximately 38,000 head words intended for use in natural language processing. This dictionary was developed by the Proteus Project at New York University under the auspices of the Linguistic Data Consortium (LDC). It contains detailed syntactic information and is now a widely-used lexical resource.

Dictation—The term "dictation" refers to speech intended for reproduction in writing.

Filter—The term "filter" refers to a technique for removing a speech recognizer output that is less likely to be a correct representation of a speech utterance input into the speech recognizer.

Finite State Machine—The term "finite state machine" refers to any device that stores the status of something at a given time and can operate on input to change the status and/or cause an action or output to take place for a given change. A finite state machine is one that has a limited or finite number of possible states.

Licensing—The term "licensing" refers to a relationship between at least two predetermined criteria as utilized in a specific filter.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer readable medium such as a floppy disk, a CD-ROM, and a flash drive.

Parser—The term "parser" refers to a filter that filters out pre-determined grammatical violations in a string of text, and assigns a structure to a legitimate phrase or sentence.

Semantic Grammar Parser—The term "semantic grammar parser" refers to an apparatus (generally a process in a computer) that takes natural language phrases and sentences as input, and assigns a set of context-free rewrite rules to that input, typically corresponding to semantic objects, relations, and events in an application domain.

Shallow Parser—The term "shallow parser" refers to a parser that does not attempt to create a full parse for an entire sentence, but only creates a partial parse.

Speech Understanding—The term "speech understanding" refers to a system that receives and analyzes a speech utterance to output a semantic representation, where the representation can be exploited to control another system.

Syntactic Grammar Parser—The term "syntactic grammar parser" refers to an apparatus (generally a process in a computer) that takes natural language phrases and sentences as input, and assigns a grammatical structure to that input.

Syntactic Head—The term "syntactic head" refers to a word that serves as the syntactic nucleus of a phrase, e.g., a verb in a verb phrase or a preposition in a prepositional phrase.

Training Corpus—The term "training corpus" refers to a collection of natural language texts which are used to set the transition probabilities for a model of some type of linguistic knowledge (e.g. acoustic, phonetic, or grammatical knowledge).

(2) PRINCIPAL ASPECTS

The present invention has three "principal" aspects. The first is a contextual filter for improving speech recognition, typically in the form of software and/or manual operations, operated using a data processing system (e.g. computer). The second principal aspect is a method for contextual filtering, the method operating on a computer system. The third principal aspect is a computer program product. The computer program product generally represents computer readable code (either source or object code) stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

(3) INTRODUCTION

The purpose of the present invention is to improve output of a speech recognizer by filtering out violations of grammatical structure. The present invention is particularly useful for dictation systems and speech recognition systems which feed their results through a syntactic and/or semantic grammar parser (henceforth referred to as "speech understanding"), since constraints imposed by these grammatical filters would produce a different (presumably better) n-best list than the same systems without the filters, thereby increasing the probability that a correct recognition will be included in the n-best list.

The filters of the present invention use sub-categorization frames of an elaborated syntactic lexicon, such as COMLEX, along with very general grammatical constraints, to filter the search results of a speech recognizer. This provides a mechanism for doing shallow parsing without requiring developers to write application-domain-specific grammar rules.

(4) DISCUSSION

The present invention has a myriad of uses, but more specifically, it can be applied to any spoken language processing system where a speech utterance is received and analyzed by the system to output a probable speech output, non-limiting examples of which include dictation and speech understanding systems. A "dictation system" is any system that receives a speech utterance and reproduces the speech utterance in writing. A "speech understanding system" is any system that receives and analyzes a speech utterance to output a semantic representation, where the semantic representation can be used to control another system. Although speech understanding systems do not currently include dictation-mode speech recognition, as mentioned, the present invention can also improve performance of the dialogue system applications which later feed recognizer output into a syntactic and/or semantic parser (speech understanding mode). Such a technique improves speech recognizer performance significantly and can be worked into a variety of products, such as commercial software products.

Figure 1:
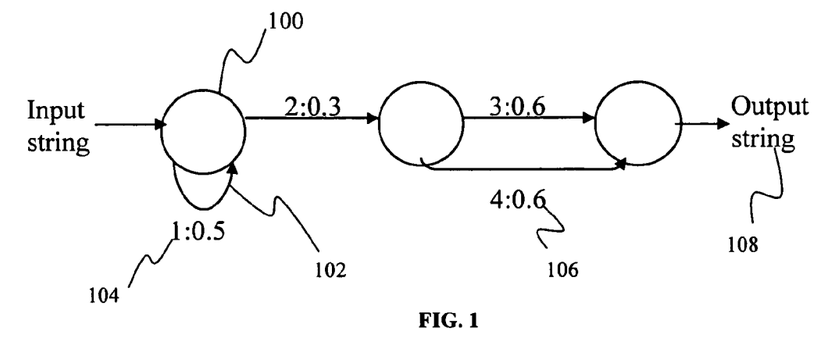
FIG. 1 is a state-diagram of a very simple Finite State Machine (FSM)

In order to describe the present invention in more detail, following is a brief explanation of a shallow parser mechanism which is a basis for implementing the present invention. The mechanism may be any applicable mechanism for receiving a speech utterance input and providing a probable output, a non-limiting example of which includes a Finite State Machine (FSM). The FSM is a mathematical model of a system with discrete input and output. It consists of a finite set of states and transitions (arcs) from state to state. An example of a very simple FSM is shown in FIG. 1. As shown in FIG. 1, each node 100 corresponds to a state and each arc 102 corresponds to a transition from one state to the other. With each arc 102, a symbol (1, 2, 3 or 4) 104 and costs (0.5 or 0.3 or 0.6 or 0.6) 106 are associated. An output 108 of this FSM is an acceptable string of 1*2[34] with cost 106 (where * indicates 0 or more occurrences of the preceding symbol 102). If the accepted string has N 1's, then the cost 106 of an accepted string of the above FSM is: 0.5*N+0.3+0.6.

FSMs have been widely used in speech recognition and text processing. For example, some operations that are performed on FSMs while processing a language are: union, concatenation, transclosure, reverse, project, invert, determinize, equivalent, minimize, best-path, intersect and compose.

The recognition of a speech utterance is achieved by computing the likelihood function:

$$P(O|\lambda) = \sum_{q_1,q_2,\ldots q_T} \pi_{q_1} b_{q_1}(o_1) a_{q_1 q_2} b_{q_2}(o_2) \ldots a_{q_{T-1} q_T} b_{q_T}(o_T)$$

where $o_t$ is the observation sequence at time t, $\lambda$ is the model, $q_i$ is the state i, $a_{q_i q_j}$ is the transition probability from state $q_i$ to $q_j$, and $b_{q_j}(o_t)$ is the observation probability, and $\pi_{q_1}$ is the initial probability of being in state $q_1$.

For the transition probabilities, an n-gram language model (such as a bigram-word pair co-occurrence or trigram-word triplet co-occurrence) is used.

In order to demonstrate how such a model is applied to improve speech recognizer output, a non-limiting example from a real speech recognizer output is presented. Generally, speech recognizers output N-best possible word strings for a given speech utterance that have N highest likelihood values. As a non-limiting illustrative example, the 10 best output of a speech recognizer by the Massachusetts Institute of Technology, located at 77 Massachusetts Avenue, Cambridge, Mass. 02139-4307, for the utterance, "<pause1> what cities do you know about in Massachusetts <pause2>" are as follows:

1. <pause1> what cities do_you know about in mass it_is it <pause2>
2. <pause1> what cities do_you know about mass it_is it <pause2>
3. <pause1> what cities do_you know about after today <pause2>
4. <pause1> what cities do_you know about in mass it_is it_is a <pause2>
5. <pause1> what cities do_you know about in massachusetts it_is a <pause2>
6. <pause1> what cities do_you know about in massachusetts it_is <pause2>
7. <pause1> what cities do_you know about in after today <pause2>
8. <pause I> what cities do_you know about in massachusetts <pause2>
9. <pause1> what cities do_you know about mass it_is it_is a <pause2>
10. <pause1> what cities do_you know about massachusetts it_is a <pause2>

As evidenced by the above list, the right answer is not the topmost, as it should be. Also, the top 7 sentences do not make sense syntactically or semantically. The top 7 sentences do not make sense because the bigram or trigram statistics do not pay attention to whether the sentence is really grammatically well-formed or not. However, these kinds of errors can be eliminated, or at least reduced, and recognition accuracy can be improved by using the output of the shallow parser of the present invention while computing the likelihood function in addition to an n-gram language model.

A basic notion that is used in the shallow parser of the present invention is that co-occurrence properties found in syntactic lexicons can be used to constrain speech recognizer search paths. The syntactic lexicon is any applicable lexicon for constraining speech recognizer search paths, a non-limiting example of which includes the COMLEX syntactic lexicon. These co-occurrence restrictions (called sub-categorization frames) are incorporated into a sub-categorization licensing filter to provide information as to what syntactic categories may occur as a grammatical complement of a given word. In addition to looking at the sub-categorization properties of words, other filters may be included.

Such additional filters utilize other kinds of grammatical relations in looking at what words and categories may co-occur, non-limiting examples of which include predication (the relation between a subject and a predicate), modifier restrictions (relation between modifying or reference-restricting phrases and the phrases they modify; for example, this could include the relation between a head noun and a relative clause), and discourse licensing (approximately, the relation between phrases or sentences in a coherent discourse).

Predetermined rules of predication are incorporated into a predication licensing filter that identifies a possible relation between a subject and a predicate. The predication licensing filter receives a word lattice and attempts to identify a relation between the subject and the predicate to determine the likelihood of match for given vocabulary items. The predication licensing filter then outputs a second word lattice with the determined probabilities. It may also be configured to remove strings of text from the word lattice that are in violation of the predication rules, and/or that fall below a predetermined threshold likelihood of match.

Predetermined modifier restrictions are incorporated into an adverbial licensing filter that is configured to receive a word lattice and identify a relation between modifying or reference-restricting phrases and phrases they modify to determine a likelihood of a match for a given string of text. The adverbial licensing filter may also be configured to remove strings of text that fall below a predetermined acceptable likelihood of match.

Discourse licensing is incorporated into a discourse licensing filter. The discourse licensing filter is configured to receive a word lattice and analyze in the word lattice the relation between phrases or sentences in a coherent discourse. The discourse licensing filter assigns a likelihood of match to each string of text in the word lattice, and may also be configured to remove strings of text that fall below a predetermined acceptable likelihood of match.

When more than one filter is included in the contextual filter, the contextual filter may be configured to multiply the probability match between each filter to create a cumulative probability match, and may further be configured to remove strings of text that fall below a predetermined threshold cumulative probability match.

Note that this approach is different from both full parsing and from bi- or trigram grammar processing. Full syntactic parsing requires that a grammar be written for each application (and as noted, this is impracticable for dictation systems), and n-gram grammars are based on finding word-pair or word-triplet tokens in a training corpus. If a word-pair or a word-triplet is not found in the training corpus then a very low probability will be assigned. If this word-pair or word-triplet is present in the test utterance then the recognizer will assign a very low probability and hence will make an error in recognizing the words. The shallow parser of the present invention, however, looks at two additional knowledge sources: (i) general grammatical licensing properties which are neither based on occurrences of specific tokens nor on application-specific grammars, and (ii) sub-categorization frames, which are associated with specific words, but which put restrictions on the grammatical (syntactic) category of the grammatical complement (as a non-limiting example, in English, this is generally the phrase immediately following the word in question).

Figure 2:
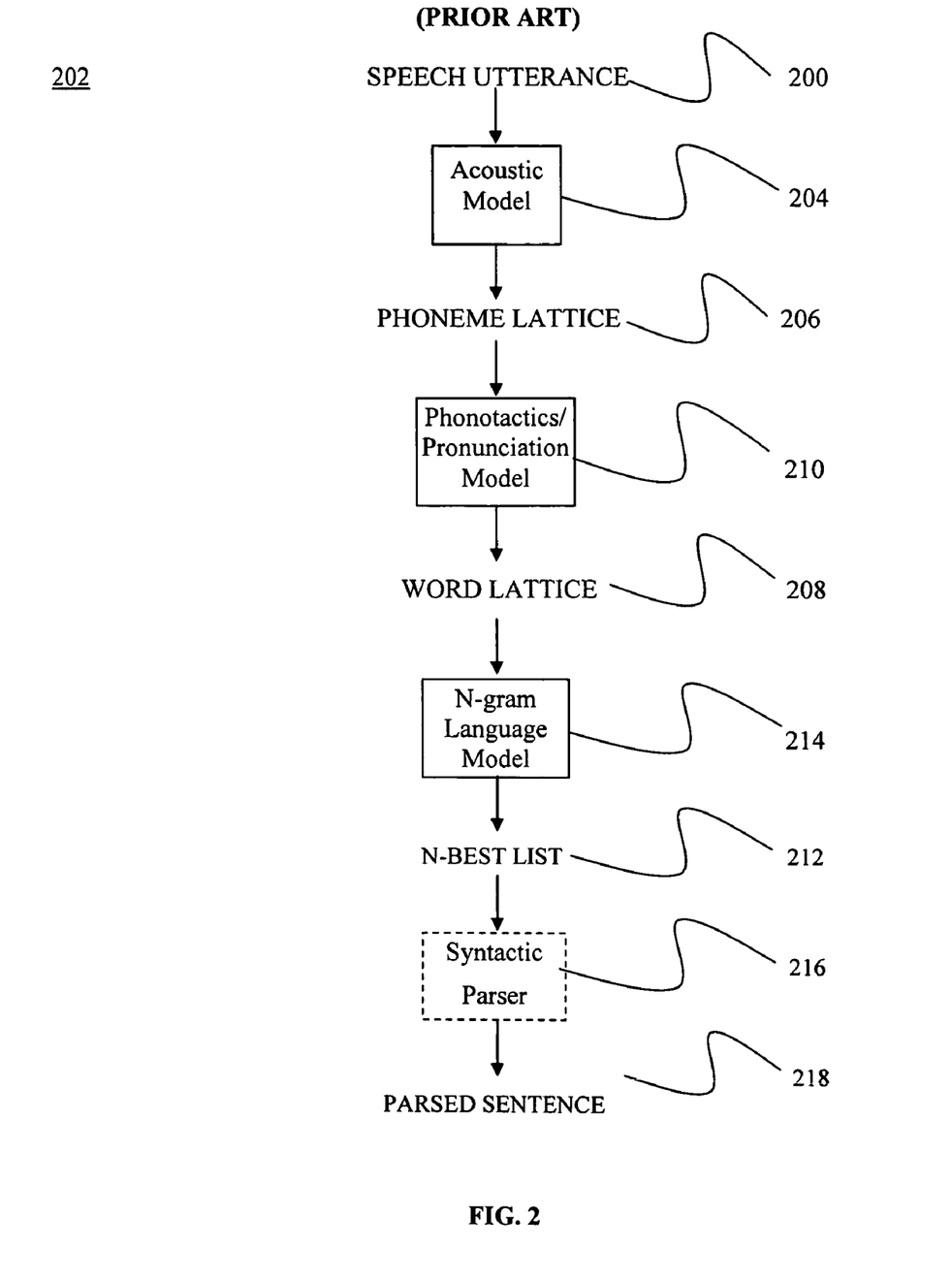
FIG. 2 is a flowchart depicting the operations of a prior art speech recognition system.

FIG. 2 illustrates a general speech recognition system architecture. As illustrated in FIG. 2, a speech signal (i.e. utterance) 200 is input to a speech recognizer 202. Using the trained acoustic model component 204, the recognizer 202 produces a phoneme lattice 206 that corresponds to the input speech utterance 200. Next, the phoneme lattice 206 is converted to a first word lattice 208 by applying the phonotactic constraints (i.e. contains the basic pronunciation rules of the language) of the phonotactic/pronunciation model component 210. The first word lattice 208 is then converted to a possible set of N-best 212 sentences by applying the N-gram language model component 214, which outputs them as the N-best list 212 of sentences (e.g. such as those presented above). The N-best list 212 may or may not be input to a full parser component 216, depending upon the desired result. For example, in dictation mode it will not be, whereas in speech understanding it generally will be in order to produce a parsed sentence 218. The full parser component 216 includes any applicable parsing module, non-limiting examples of which include a syntactic parser and a semantic parser.

Figure 3:
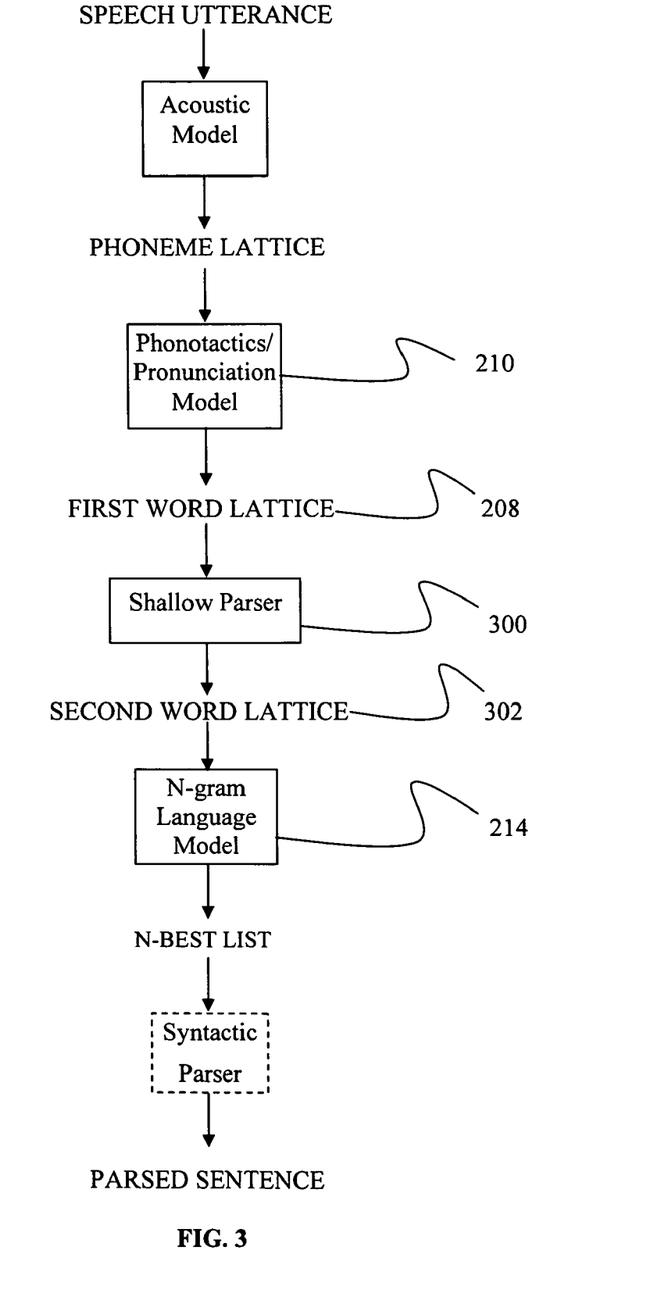
FIG. 3 is a flowchart depicting the operations of a speech recognition system including a shallow parser according to the present invention.

As shown in FIG. 3, one difference between the present invention and the prior art is the interpolation of an additional processing step, such that the first word lattice 208 produced by the phonotactic/pronunciation component 210 is submitted to a shallow parser component 300 prior to being submitted to the N-gram language model component 214. Passing the first word lattice 208 through the shallow parser component 300 results in a second word lattice 302 which is thereafter submitted to the N-gram language model component 214.

Figure 4:
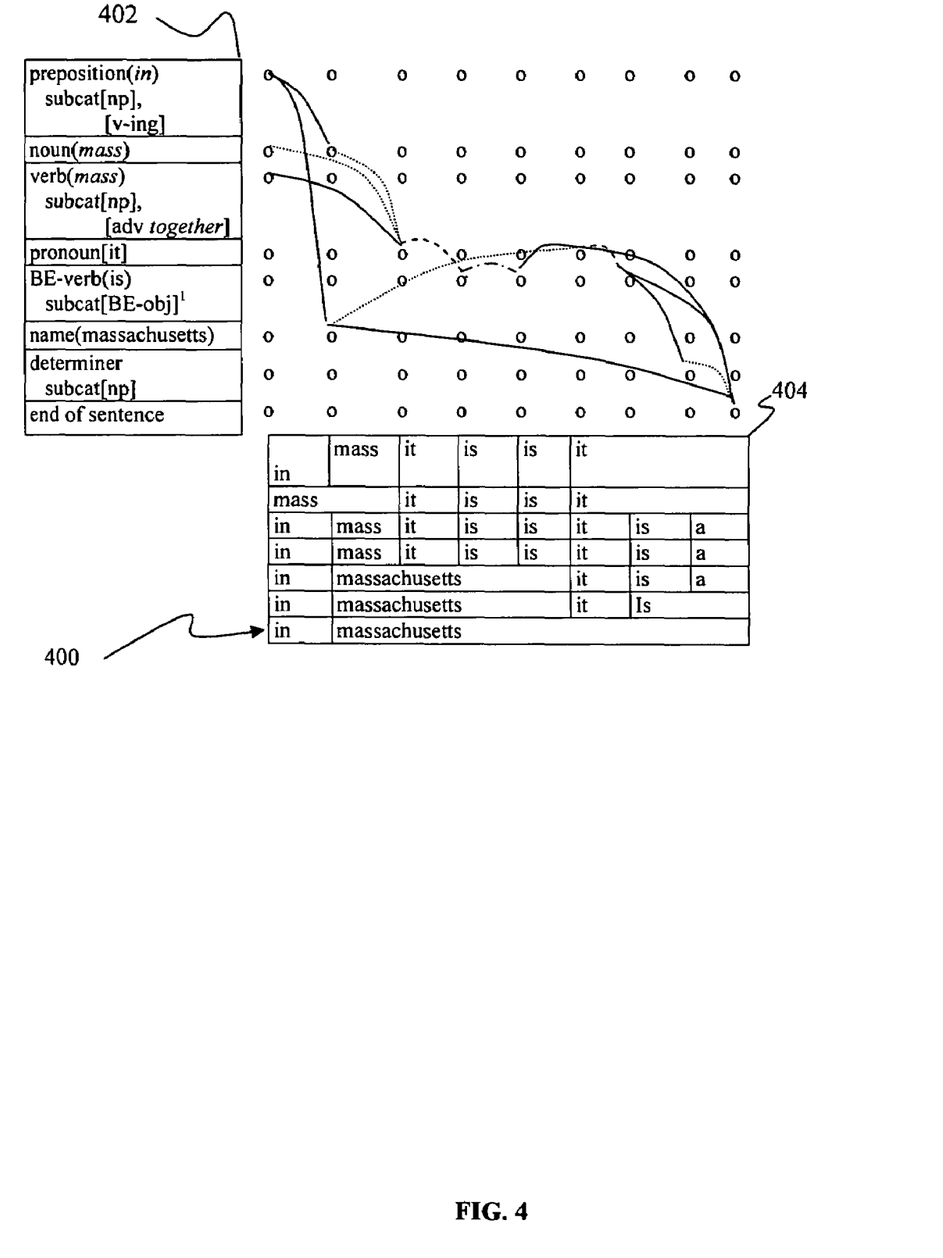
FIG. 4 is a graph of an FSM which encodes sub-categorization frames according to the present invention.

The shallow parser component 300 uses any applicable syntactic lexicon to yield better results than the prior art of FIG. 2, a non-limiting example of which includes the syntactic lexicon COMLEX from the Linguistic Data Consortium. Concentrating on the part of the sentence that was misrecognized (i.e., in the first seven sentences in the n-best list above), it can be shown how the shallow parser 300 would yield the correct result. FIG. 4 illustrates a non-limiting example of an FSM which encodes some sample sub-categorization frames.

The n-best candidate recognitions which were ordered before the correct recognition are shown below (though for ease of exposition, sentences 3 and 5 are ignored), as is the correct recognition, and the way that each recognition would trace through the FSM is indicated in FIG. 4. By inspection of the diagram of FIG. 4, it can be seen that the path which has the highest confidence is in Massachusetts 400, the correct result. All of the other candidate recognitions include arcs with lower confidences.

<pause1> what cities do_you know about in mass it_is it <pause2>

<pause1> what cities do_you know about mass it_is it <pause2>

<pause1> what cities do_you know about in mass it_is it_is a <pause2>

<pause1> what cities do_you know about in massachusetts it_is a <pause2>

<pause1> what cities do_you know about in massachusetts it_is <pause2>

<pause1> what cities do_you know about in massachusetts <pause2>

The relative confidence levels of each arc in the FSM of FIG. 4 are as follows:

______ Sub-categorization licensing; highest confidence;

------ Predication licensing; second-highest confidence;

............ Adverbial licensing; third-highest confidence; and

— · — · — Discourse licensing; lowest confidence.

Although the FSM of FIG. 4 satisfies sub-categorization requirements of particular words (the y axis 402) with other particular words (the x axis 404), a generalized version of the FSM can be created.

Figure 5:
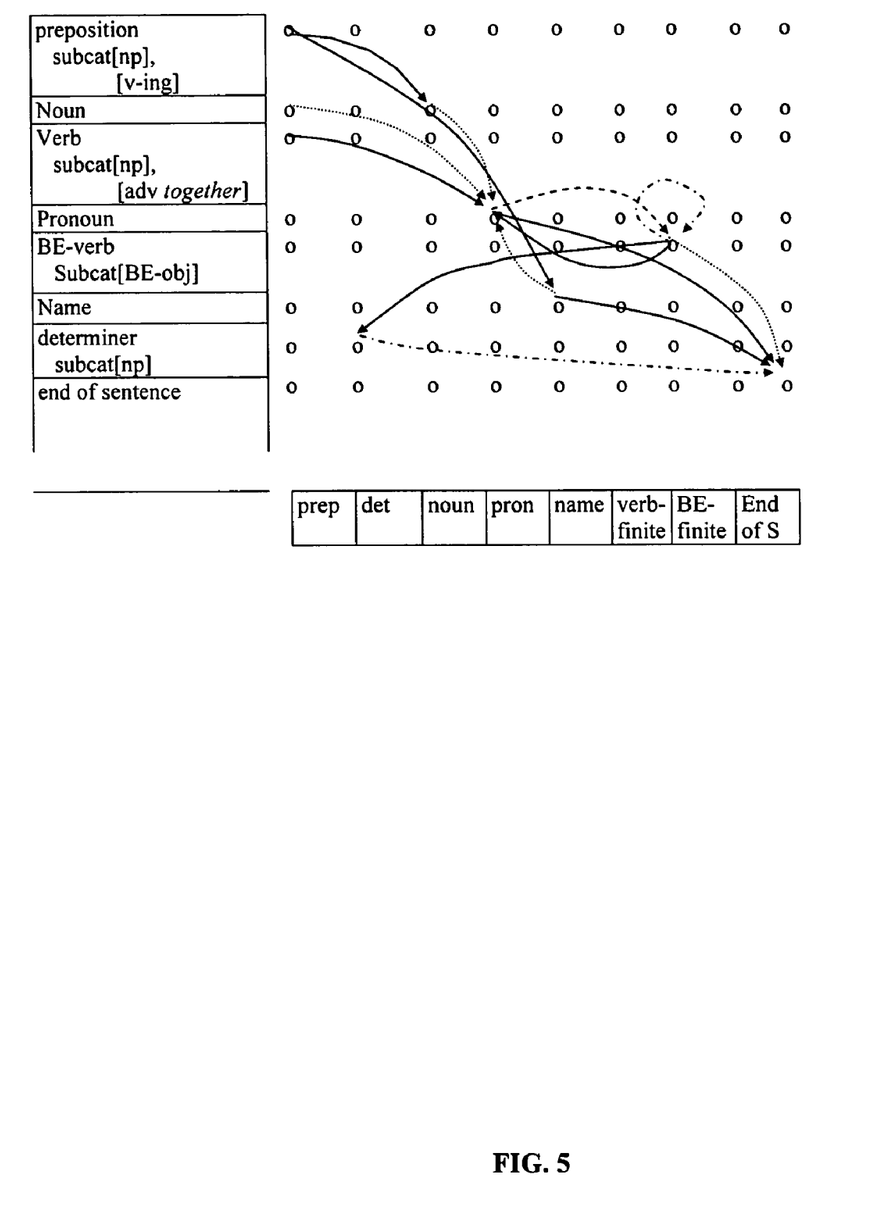
FIG. 5 is a graph of a generalized version of the FSM of FIG. 4 according to the present invention.

The generalized version of the FSM of FIG. 4, is illustrated in FIG. 5 (Please note: the states are not time-aligned on the x-axis, necessitating the use of directed graph notation).

The relative confidence levels of each arc in the FSM of FIG. 5 are the same as before, where:

______ Sub-categorization licensing; highest confidence;

------ Predication licensing; second-highest confidence;

............ Adverbial licensing; third-highest confidence; and

— · — · — Discourse licensing; lowest confidence.

Given the small word graph and FSM, along with the relative likelihoods for the different arcs noted, it can be approximated what the revised N-best list will be for the 6 sentences considered in this example (a rough probability estimate for each of the following is also shown). Below the revised N-best is shown, followed by the original; the numbers on the left side allow for the two lists to be compared easily:[1]

[1]For the purposes of calculating a numeric value for each of the recognition hypotheses, an extremely simple method of estimating likelihoods was used: simplistic probabilities were assigned to each relation type as shown below, and then the average value of all the arcs comprising each recognition candidate were taken. The a priori probabilities given to each of the relation types was: subcategorization, 0.5; predication, 0.25; adverbial relation, 0.125; discourse licensing, 0.0625. For the real implementation, these would be refined based on real data.

6. what cities do_you know about in massachussetts (0.5)

1. what cities do_you know about in mass it_is it (0.3229)

4. what cities do_you know about in massachussetts it_is a (0.2875)

3. what cities do_you know about in mass it_is it_is a (0.2812)

5. what cities do_you know about in massachussetts it_is (0.25)

2. what cities do_you know about mass it_is it (0.2343)

1. <pause1> what cities do_you know about in mass it_is it <pause2>

2. <pause1> what cities do_you know about mass it_is it <pause2>

3. <pause1> what cities do_you know about in mass it_is it_is a <pause2>

4. <pause1> what cities do_you know about in Massachusetts it_is a <pause2>

5. <pause1> what cities do_you know about in Massachusetts it_is <pause2>

6. <pause1> what cities do_you know about in Massachusetts <pause2>

The N-best lists above provide us with the following pertinent conclusions: (i) the two lists are ordered quite differently, and (ii) that the topmost hypothesis in the revised list is the correct one.

In the latter (generalized) FSM of FIG. 5, both the x and y axes of the FSM consist only of lexical categories and features. Although the present invention can be applied to any language, for illustrative purposes, it will be discussed in the context of the English language. While a much larger FSM would need to be developed to cover large portions of a language (e.g., English), this demonstrates the concept, which is easily scalable. Note also that prior relative probabilities have been assigned to the various types of arcs in the example. In the general model, arc probabilities can be derived from a syntactically tagged English corpus. Notice that there is an important difference between deriving arc probabilities from a syntactically tagged English corpus for our purposes, and deriving arc probabilities for n-gram language models from a training corpus. In order to develop a good n-gram language model from a corpus, the corpus size must be on the order of a million or, ideally, many millions of words. In order to develop a good FSM grammar model from a tagged corpus as provided for in the present invention, the corpus size can be a small fraction of that; on the order of tens of thousands of words. The reduced number is because the FSM of the present invention is between grammatical categories of words, not between individual actual word tokens. As such, a given instance of sequences of grammatical categories will provide a template which will accommodate hundreds, even thousands of sequences of word tokens. Furthermore, sequences of grammatical categories are much more widely shared across different application domains than are sequences of particular words, thus, a model trained on a particular corpus using the method of the present invention will be more generally applicable to other domains than would a model trained using conventional n-gram methods.

In this last respect, the present invention resembles use of class-based n-grams in automated speech recognition (ASR) language models. Classes are a way of dealing with the sparse data problem common to most n-gram language modeling efforts. Classes allow states of a FSM to be associated not just with particular words, but with sets of words (potentially very large sets, such as all proper names). This allows one, for example, to encode in a language model the fact that the sequence "wilshire boulevard," "pico boulevard," "olympic boulevard," etc. are all cases of <street-basename>+boulevard. By then specifying that Wilshire, pico, olympic and any other number of street names all belong to the class street-basename, a user is saved from having to find in a training corpus all cases of street names to recognize with the word "boulevard" following them; if any cases of street names in a training corpus are found, valid probabilities to the whole class of <street-basenames> in relevant contexts can be assigned, based on those occurrences.

A notable feature of the present invention is that it exploits lexical subcategorization frames as a way of identifying allowable sequences of classes (where the classes are lexical and grammatical categories). Although applicable to any language, this technique can be readily implemented for English because of the rich existing computational linguistic resources (such as the Linguistic Data Consortium's COMLEX). As other resources become available for other languages, the technique will be extendible to them also.

Figure 6:
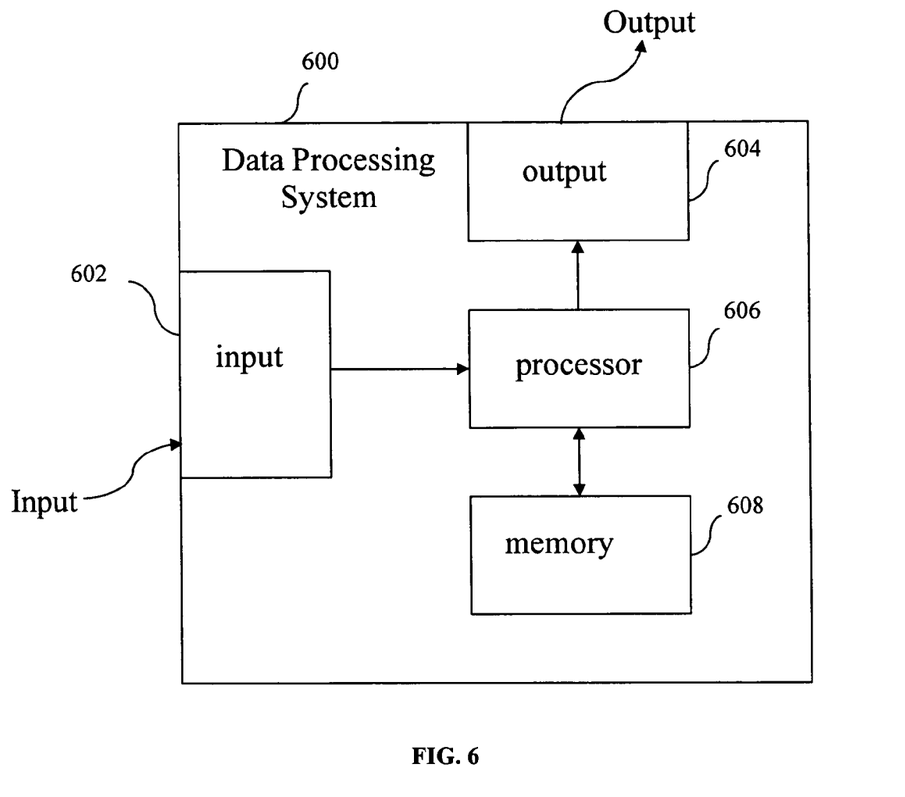
FIG. 6 is a block diagram depicting components of a data process system according to the present invention.

FIG. 6 illustrates a component diagram depicting components of a data processing system 600 (e.g., server computer) incorporating the operations of the method and technique described above. The technique utilizes the data processing system 600 for storing computer-executable instructions for causing a processor to carry out the operations of the above described technique. The data processing system 600 comprises an input 602 for receiving information from a user. Information received may include input from devices such as scanners, keypads, keyboards, microphone, other peripherals such as storage devices, other programs, etc. The input 600 may include multiple "ports." An output 604 is connected with the processor for providing information for transmission to other data processing systems, to storage devices, to display devices such as monitors, to generating information necessary for delivery, and to other mechanisms for presentation in user-usable forms. Output may also be provided to other devices or other programs, e.g. to other software modules, for use therein. The input 602 and the output 604 are both coupled with a processor 606, which may be a general-purpose computer processor or a specialized processor designed specifically for use with the present invention. The processor 606 is coupled with a memory 608 to permit storage of data and software to be manipulated by commands to the processor.

Figure 7:
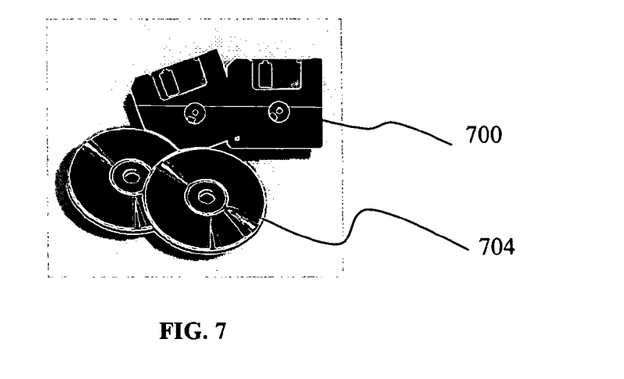
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer-readable code stored on any compatible computer-readable medium.

(5) CONCLUSION

The present invention is a filter, method, and computer program product for contextual filtering to improve an output of a speech recognizer. Although speech recognizers have previously been devised, none heretofore devised have incorporated a shallow parser (i.e., sub-categorization filter) using rules according to a syntactic lexicon. Through use of the shallow parser, the present invention uses a finite state machine to increase a likelihood that an output of the speech recognizer is a correct representation of a speech utterance input.

What is claimed is:

1. A contextual filter for use within a computer-based speech recognition system comprising:
    a shallow parser input for receiving a representation of an utterance into a shallow parser component in a form of a first word lattice, the first word lattice including a set of potential textual word sequence matches for the utterance, where the textual word sequence matches include at least one word;
    the shallow parser component operative for receiving and analyzing the first word lattice to produce a second word lattice, and including a filter selected from a group consisting of a sub-categorization licensing filter, a predication licensing filter, an adverbial licensing filter, and a discourse licensing filter, where the filter assigns a probability match for a potential word match in relation to another potential word match in the utterance based on a particular filter-specific criteria; and
    a shallow parser output for outputting the probability matches from the shallow parser component as a portion of a second word lattice for further processing to determine most likely combinations of words present in the utterance.

2. A contextual filter as set forth in claim 1, wherein the sub-categorization licensing filter is configured to use co-occurrence restrictions found in syntactic lexicons to provide information as to what lexical categories may occur as a grammatical complement of a particular word, and using the lexical categories to determine a likelihood of a match for a given vocabulary item, given the particular word.

3. A contextual filter as set forth in claim 2, wherein in analyzing the first word lattice to produce the second word lattice, the sub-categorization licensing filter is configured to remove strings of text that fall below a predetermined threshold likelihood of match.

4. A contextual filter as set forth in claim 1, wherein the predication licensing filter is configured to identify a relation between a subject and a predicate to determine a likelihood of a match for given vocabulary items.

5. A contextual filter as set forth in claim 1, wherein in analyzing the first word lattice to produce the second word lattice, the predication licensing filter is configured to remove strings of text that fall below a predetermined threshold likelihood of match.

6. A contextual filter as set forth in claim 1, wherein the adverbial licensing filter is configured to identify a relation between modifying or reference-restricting phrases and phrases they modify to determine a likelihood of a match for given vocabulary items.

7. A contextual filter as set forth in claim 1, wherein in analyzing the first word lattice to produce the second word lattice, the adverbial licensing filter is configured to remove strings of text that fall below a predetermined threshold likelihood of match.

8. A contextual filter as set forth in claim 1, wherein the discourse licensing filter is configured to identify a relation between phrases or sentences in a coherent discourse to determine a likelihood of a given match for given vocabulary items.

9. A contextual filter as set forth in claim 1, wherein in analyzing the first word lattice to produce the second word lattice, the discourse licensing filter is configured to remove strings of text that fall below a predetermined threshold likelihood of match.

10. A contextual filter as set forth in claim 1, further comprising:
an acoustic model input for receiving an utterance into an acoustic model component and producing a phoneme lattice for further processing into the word lattice;
the acoustic model component operative for receiving the utterance and analyzing the utterance to produce a phoneme lattice that corresponds to the utterance; and
an acoustic model output for outputting the phoneme lattice for further processing.

11. A contextual filter as set forth in claim 10, further comprising:
a phonotactics/pronunciation model input for receiving the phoneme lattice into a phonotactics/pronunciation model component;
the phonotactics/pronunciation model component operative for receiving the phoneme lattice and converting the phoneme lattice into a first word lattice by applying phonotatic constraints to the phoneme lattice, thereby converting the phoneme lattice into the first word lattice; and
a phonotactics/pronunciation model output for outputting the first word lattice for further processing.

12. A contextual filter as set forth in claim 1, further comprising:
an N-gram language model input for receiving the second word lattice into an N-gram language model component;
the N-gram language model component operative for receiving the second word lattice and converting the second word lattice into an N-best list by applying a language model component that outputs an N-best possible word string for a given utterance that have N highest likelihood values; and
an N-gram language model output for outputting the N-best list from the N-gram language model component for further processing.

13. A contextual filter as set forth in claim 12, further comprising:
a full parser input for receiving the N-best list into a full parser component;
the full parser component operative for receiving the N-best list and converting the N-best list into a parse structure through at least one item selected from a group consisting of a syntactic parser and a semantic parser; and
a full parser output for outputting the parse structure from the full parser component.

14. A contextual filter as set forth in claim 1, wherein in analyzing the first word lattice to produce the second word lattice, and when more than one filter is included in the contextual filter, the contextual filter is configured to multiply the probability match between each filter to create a cumulative probability match, and is further configured to remove strings of text that fall below a predetermined threshold cumulative probability match.

15. A method for contextual filtering, the method operating on a computer system including a processor, an input coupled with the processor for receiving an input, and an output coupled with the processor for producing an output, the method comprising acts of:
receiving a representation of an utterance into a shallow parser component in the form of a first word lattice including a set of potential textual word sequence matches for the utterance, where the textual word sequence matches include at least one word;
receiving and analyzing the first word lattice to produce a second word lattice utilizing a filter selected from a group consisting of a sub-categorization licensing filter, a predication licensing filter, an adverbial licensing filter, and a discourse licensing filter, where the filter assigns a probability match for a potential word match in relation to another potential word match in the utterance based on a particular filter-specific criteria; and
outputting the probability matches from the shallow parser component as a portion of a second word lattice for further processing to determine most likely combinations of words present in the utterance.

16. A method for contextual filtering as set forth in claim 15, wherein the act of receiving and analyzing the first word lattice to produce a second word lattice further comprises an act of configuring the sub-categorization licensing filter to use co-occurrence restrictions found in syntactic lexicons to provide information as to what lexical categories may occur as a grammatical complement of a particular word, and using the lexical categories to determine a likelihood of a match for a given vocabulary item, given the particular word.

17. A method for contextual filtering as set forth in claim 16, wherein the act of receiving and analyzing the first word lattice to produce the second word lattice, further comprises an act of configuring the sub-categorization licensing filter to remove strings of text that fall below a predetermined threshold likelihood of match.

18. A method for contextual filtering as set forth in claim 15, wherein the act of receiving and analyzing the first word lattice to produce a second word lattice further comprises an act of configuring the predication licensing filter to identify a relation between a subject and a predicate to determine a likelihood of a match for given vocabulary items.

19. A method for contextual filtering as set forth in claim 15, wherein the act of receiving and analyzing the first word lattice to produce the second word lattice, further comprises an act of configuring the predication licensing filter to remove strings of text that fall below a predetermined threshold likelihood of match.

20. A method for contextual filtering as set forth in claim 15, wherein the act of receiving and analyzing the first word lattice to produce a second word lattice further comprises an act of configuring the adverbial licensing filter to identify a relation between modifying or reference-restricting phrases and phrases they modify to determine a likelihood of a match for given vocabulary items.

21. A method for contextual filtering as set forth in claim 15, wherein the act of receiving and analyzing the first word lattice to produce the second word lattice, further comprises an act of configuring the adverbial licensing filter to remove strings of text that fall below a predetermined threshold likelihood of match.

22. A method for contextual filtering as set forth in claim 15, wherein the act of receiving and analyzing the first word lattice to produce a second word lattice further comprises an act of configuring the discourse licensing filter to identify a relation between phrases or sentences in a coherent discourse to determine a likelihood of a given match for given vocabulary items.

23. A method for contextual filtering as set forth in claim 15, wherein the act of receiving and analyzing the first word lattice to produce the second word lattice, further comprises an act of configuring the discourse licensing filter to remove strings of text that fall below a predetermined threshold likelihood of match.

24. A method for contextual filtering as set forth in claim 15, further comprising acts of:
   receiving an utterance into an acoustic module;
   analyzing the utterance to produce a phoneme lattice that corresponds to the utterance; and
   outputting the phoneme lattice from the acoustic model component for further processing into the first word lattice.

25. A method for contextual filtering as set forth in claim 24, further comprising acts of:
   receiving the phoneme lattice into a phonotactics/pronunciation module;
   converting the phoneme lattice into a first word lattice by applying phonotatic constraints to the phoneme lattice, thereby converting the phoneme lattice into the first word lattice; and
   outputting the first word lattice for further processing by the parser component.

26. A method for contextual filtering as set forth in claim 15, further comprising acts of:
   receiving the second word lattice into an N-gram language module;
   converting the second word lattice into an N-best list by applying a language model component that outputs an N-best possible word string for a given utterance that have N highest likelihood values; and
   outputting the N-best list from the N-gram language model component for further processing.

27. A method for contextual filtering as set forth in claim 26, further comprising acts of:
   receiving the N-best list into a full parser component;
   converting the N-best list into a parse structure through at least one item selected from a group consisting of a syntactic parser and a semantic parser; and
   outputting the parse structure from the full parser component.

28. A method for contextual filtering as set forth in claim 25, wherein the act of receiving and analyzing the first word lattice to produce the second word lattice, further comprises an act of configuring the contextual filter to multiply the probability match between each filter to create a cumulative probability match, and to remove strings of text that fall below a predetermined threshold cumulative probability match.

29. A computer program product for contextual filtering, comprising computer instruction means stored on a computer readable medium, for:
   receiving a representation of an utterance into a shallow parser component in a form of a first word lattice including a set of potential textual word sequence matches for the utterance, where the textual word sequence matches include at least one word;
   receiving and analyzing the first word lattice to produce a second word lattice utilizing a filter selected from a group consisting of a sub-categorization licensing filter, a predication licensing filter, an adverbial licensing filter, and a discourse licensing filter, where the filter assigns a probability match for a potential word match in relation to another potential word match in the utterance based on a particular filter-specific criteria; and
   outputting the probability matches from the shallow parser component as a portion of a second word lattice for further processing to determine most likely combinations of words present in the utterance.

30. A computer program product for contextual filtering at set forth in claim 29, wherein the computer instruction means for receiving and analyzing the first word lattice to produce a second word lattice further comprises computer instruction means for configuring the sub-categorization licensing filter to use co-occurrence restrictions found in syntactic lexicons to provide information as to what lexical categories may occur as a grammatical complement of a particular word, and using the lexical categories to determine a likelihood of a match for a given vocabulary item, given the particular word.

31. A computer program product for contextual filtering at set forth in claim 30, wherein the computer instruction means for receiving and analyzing the first word lattice to produce the second word lattice further comprises a computer instruction means for causing the sub-categorization licensing filter to remove strings of text that fall below a predetermined threshold likelihood of match.

32. A computer program product for contextual filtering at set forth in claim 29, wherein the computer instruction means for receiving and analyzing the first word lattice to produce a second word lattice further comprises a computer instruction means for configuring the predication licensing filter to identify a relation between a subject and a predicate to determine a likelihood of a match for given vocabulary items.

33. A computer program product for contextual filtering at set forth in claim 29, wherein the computer instruction means for receiving and analyzing the first word lattice to produce the second word lattice, further comprises a computer instruction means for causing the predication licensing filter to remove strings of text that fall below a predetermined threshold likelihood of match.

34. A computer program product for contextual filtering at set forth in claim 29, wherein the computer instruction means for receiving and analyzing the first word lattice to produce a second word lattice further comprises computer instruction means for configuring the adverbial licensing filter to identify a relation between modifying or reference-restricting phrases and phrases they modify to determine a likelihood of a match for given vocabulary items.

35. A computer program product for contextual filtering at set forth in claim 29, wherein the computer instruction means for receiving and analyzing the first word lattice to produce the second word lattice, further comprises a computer instruction means for causing the adverbial licensing filter to remove strings of text that fall below a predetermined threshold likelihood of match.

36. A computer program product for contextual filtering at set forth in claim 29, wherein the computer instruction means for receiving and analyzing the first word lattice to produce a second word lattice further comprises computer instruction means for configuring the discourse licensing filter to identify a relation between phrases or sentences in a coherent discourse to determine a likelihood of a given match for given vocabulary items.

37. A computer program product for contextual filtering at set forth in claim 29, wherein the computer instruction means for receiving and analyzing the first word lattice to produce the second word lattice, further comprises a computer instruction means for causing the discourse licensing filter to remove strings of text that fall below a predetermined threshold likelihood of match.

38. A computer program product for contextual filtering at set forth in claim 29, further comprising computer instruction means for:
  receiving an utterance into an acoustic module;
  analyzing the utterance to produce a phoneme lattice that corresponds to the utterance; and
  outputting the phoneme lattice from the acoustic model component for further processing into the first word lattice.

39. A computer program product for contextual filtering at set forth in claim 38, further comprising computer instruction means for:
  receiving the phoneme lattice into a phonotactics/pronunciation module;
  converting the phoneme lattice into a first word lattice by applying phonotatic constraints to the phoneme lattice, thereby converting the phoneme lattice into the first word lattice; and
  outputting the first word lattice for further processing by the parser component.

40. A computer program product for contextual filtering at set forth in claim 29, further comprising computer instruction means for:
  receiving the second word lattice into an N-gram language module;
  converting the second word lattice into an N-best list by applying a language model component that outputs an N-best possible word string for a given utterance that have N highest likelihood values; and
  outputting the N-best list from the N-gram language model component for further processing.

41. A computer program product for contextual filtering at set forth in claim 40, further comprising computer instruction means for:
  receiving the N-best list into a full parser component;
  converting the N-best list into a parse structure through at least one item selected from a group consisting of a syntactic parser and a semantic parser; and
  outputting the parse structure from the full parser component.

42. A computer program product for contextual filtering at set forth in claim 29, wherein the computer instruction means for receiving and analyzing the first word lattice to produce the second word lattice, further comprises a computer instruction means for causing the contextual filter to multiply the probability match between each filter to create a cumulative probability match, and to remove strings of text that fall below a predetermined threshold cumulative probability match.

\* \* \* \* \*